(12) United States Patent
Wang et al.

(10) Patent No.: US 10,055,951 B2
(45) Date of Patent: Aug. 21, 2018

(54) ELECTRONIC DEVICE INCLUDING SOUND LEVEL BASED DRIVING OF HAPTIC ACTUATOR AND RELATED METHODS

(71) Applicant: APPLE INC., Cupertino, CA (US)

(72) Inventors: Xuefeng Wang, San Jose, CA (US); Sungchang Lee, Saratoga, CA (US); Wei Guang Wu, Cupertino, CA (US); Yuanyuan Song, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/730,811

(22) Filed: Oct. 12, 2017

(65) Prior Publication Data

US 2018/0033265 A1 Feb. 1, 2018

Related U.S. Application Data

(63) Continuation of application No. 15/252,829, filed on Aug. 31, 2016, now Pat. No. 9,818,272.

(60) Provisional application No. 62/317,850, filed on Apr. 4, 2016.

(51) Int. Cl.
*G08B 6/00* (2006.01)
*H04M 1/02* (2006.01)
*H04W 88/02* (2009.01)

(52) U.S. Cl.
CPC .............. *G08B 6/00* (2013.01); *H04M 1/026* (2013.01); *H04W 88/02* (2013.01)

(58) Field of Classification Search
None
See application file for complete search history.

(56) References Cited

U.S. PATENT DOCUMENTS

| 3,858,170 | A | * | 12/1974 | Freeman .................. G01V 1/04 324/345 |
|---|---|---|---|---|
| 4,897,582 | A | | 1/1990 | Otten et al. |
| 5,999,168 | A | | 12/1999 | Rosenberg et al. |
| 8,169,402 | B2 | | 5/2012 | Shahoian et al. |
| 8,287,522 | B2 | | 10/2012 | Moses et al. |
| 8,378,965 | B2 | | 2/2013 | Gregorio et al. |

(Continued)

FOREIGN PATENT DOCUMENTS

| WO | 2013169299 | 11/2013 |
| WO | 2013169303 | 11/2013 |

(Continued)

OTHER PUBLICATIONS

Product Specification Sheet: GEEPLUS, VIBRO1 Vibration Actuator, 2 pages, www.geeplus.biz, downloaded on Jul. 15, 2015. See Priority U.S. Appl. No. 15/252,829, filed Aug. 31, 2016.

*Primary Examiner* — Fekadeselass Girma
(74) *Attorney, Agent, or Firm* — Allen, Dyer, Doppelt + Gilchrist, P.A.

(57) ABSTRACT

An electronic device may include a device housing, a haptic actuator carried by the device housing, and an audio input transducer carried by the device housing. The electronic device may also include a controller coupled to the audio input transducer and the haptic actuator. The controller may be capable of determining a sound level of the haptic actuator, attempting to drive the haptic actuator to operate within a desired sound level range, and when unable to drive the haptic actuator within the desired sound level range, then generating a warning indication.

22 Claims, 7 Drawing Sheets

(56) References Cited

U.S. PATENT DOCUMENTS

| | | | |
|---|---|---|---|
| 8,686,839 B2 | 4/2014 | Posamentier | |
| 9,117,347 B2* | 8/2015 | Matthews | G08B 6/00 |
| 9,182,820 B1* | 11/2015 | Hebenstreit | G09B 21/003 |
| 9,183,710 B2* | 11/2015 | Zellers | G08B 6/00 |
| 9,836,025 B2* | 12/2017 | Ely | G04B 27/002 |
| 9,836,123 B2* | 12/2017 | Gipson | G06F 3/016 |
| 2007/0098119 A1* | 5/2007 | Stothers | G05B 13/042 375/345 |
| 2008/0191648 A1 | 8/2008 | Ito et al. | |
| 2009/0208025 A1* | 8/2009 | Hayashi | B60R 11/0223 381/71.4 |
| 2010/0201290 A1* | 8/2010 | Becker | B41J 2/04508 318/116 |
| 2011/0248837 A1* | 10/2011 | Israr | G06F 3/016 340/407.1 |
| 2012/0168233 A1* | 7/2012 | Clark | H01L 41/094 180/8.1 |
| 2012/0206248 A1* | 8/2012 | Biggs | G06F 3/016 340/407.2 |
| 2012/0229264 A1 | 9/2012 | Company Bosch et al. | |
| 2013/0078976 A1 | 3/2013 | Naftolin | |
| 2013/0264973 A1 | 10/2013 | Garg et al. | |
| 2014/0067770 A1* | 3/2014 | Cheong | G06F 11/1048 707/687 |
| 2014/0070957 A1 | 3/2014 | Longinotti-Buitoni et al. | |
| 2014/0197936 A1 | 7/2014 | Biggs et al. | |
| 2014/0347176 A1 | 11/2014 | Modarres et al. | |
| 2015/0005039 A1 | 1/2015 | Liu et al. | |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2015/0338919 A1 | 11/2015 | Weber et al. | |
| 2016/0041070 A1* | 2/2016 | Wascat | G01M 7/00 702/183 |
| 2016/0306423 A1* | 10/2016 | Uttermann | G06F 3/016 |
| 2016/0353206 A1* | 12/2016 | Stahl | H04R 7/04 |
| 2017/0094429 A1* | 3/2017 | Bervoets | H04R 25/606 |
| 2017/0136354 A1* | 5/2017 | Yamano | A63F 13/285 |

FOREIGN PATENT DOCUMENTS

| | | |
|---|---|---|
| WO | 2013169305 | 11/2013 |
| WO | 2013170099 | 11/2013 |
| WO | 2013188307 | 12/2013 |
| WO | 2014018111 | 1/2014 |
| WO | 2015020663 | 2/2015 |

* cited by examiner

ELECTRONIC DEVICE INCLUDING SOUND LEVEL BASED DRIVING OF HAPTIC ACTUATOR AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

An electronic device may include a device housing, a haptic actuator carried by the device housing, and an audio input transducer carried by the device housing. The electronic device may also include a controller coupled to the audio input transducer and the haptic actuator. The controller may be capable of determining a sound level of the haptic actuator, attempting to drive the haptic actuator to operate within a desired sound level range, and when unable to drive the haptic actuator within the desired sound level range, then generating a warning indication. Accordingly, the drive signal may be changed, e.g., the amplitude, so that the sound level of the haptic actuator may be reduced.

The warning indication may be indicative of haptic actuator failure, for example. The warning indication may include at least one of a visual and audible notification.

The electronic device may further include wireless communications circuitry carried by the device housing. The controller may be capable of communicating, via the wireless communications circuitry, the warning indication, for example.

The electronic device may also include an audio output transducer carried by the device housing. The controller may be capable of cooperating with the audio output transducer to generate an offsetting sound at an offsetting sound level, for example.

The audio input transducer may be positioned within the device housing facing the haptic actuator. The haptic actuator may include a haptic housing, a field member movable within the haptic housing, and at least one magnet. The haptic actuator may also include at least one coil cooperating with the at least one magnet to move the field member within the haptic housing.

A method aspect is directed to a method of operating an electronic device that includes a device housing, a haptic actuator carried by the device housing, an audio input transducer carried by the device housing, and a controller coupled to the audio input transducer and the haptic actuator. The method may include using the controller for determining a sound level of the haptic actuator, and attempting to drive the haptic actuator to operate within a desired sound level range. The method may also include using the controller for, when unable to drive the haptic actuator within the desired sound level range, then generating a warning indication.

Another device aspect is directed to an electronic device that may include a device housing, a haptic actuator carried by the device housing, and an accelerometer carried by the device housing. The electronic device may also include a controller coupled to the accelerometer and the haptic actuator and capable of determining an acceleration of the haptic actuator and attempting to drive the haptic actuator to operate within a desired sound level range based upon the determined acceleration. The controller may also be capable of, when unable to drive the haptic actuator within the desired sound level range, then generating a warning indication.

A related method aspect is directed to a method of operating an electronic device that includes a device housing, a haptic actuator carried by the device housing, an accelerometer carried by the device housing, and a controller coupled to the accelerometer and the haptic actuator. The method may include using the controller for determining an acceleration of the haptic actuator, attempting to drive the haptic actuator to operate within a desired sound level range based upon the determined acceleration, and when unable to drive the haptic actuator within the desired sound level range, then generating a warning indication.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
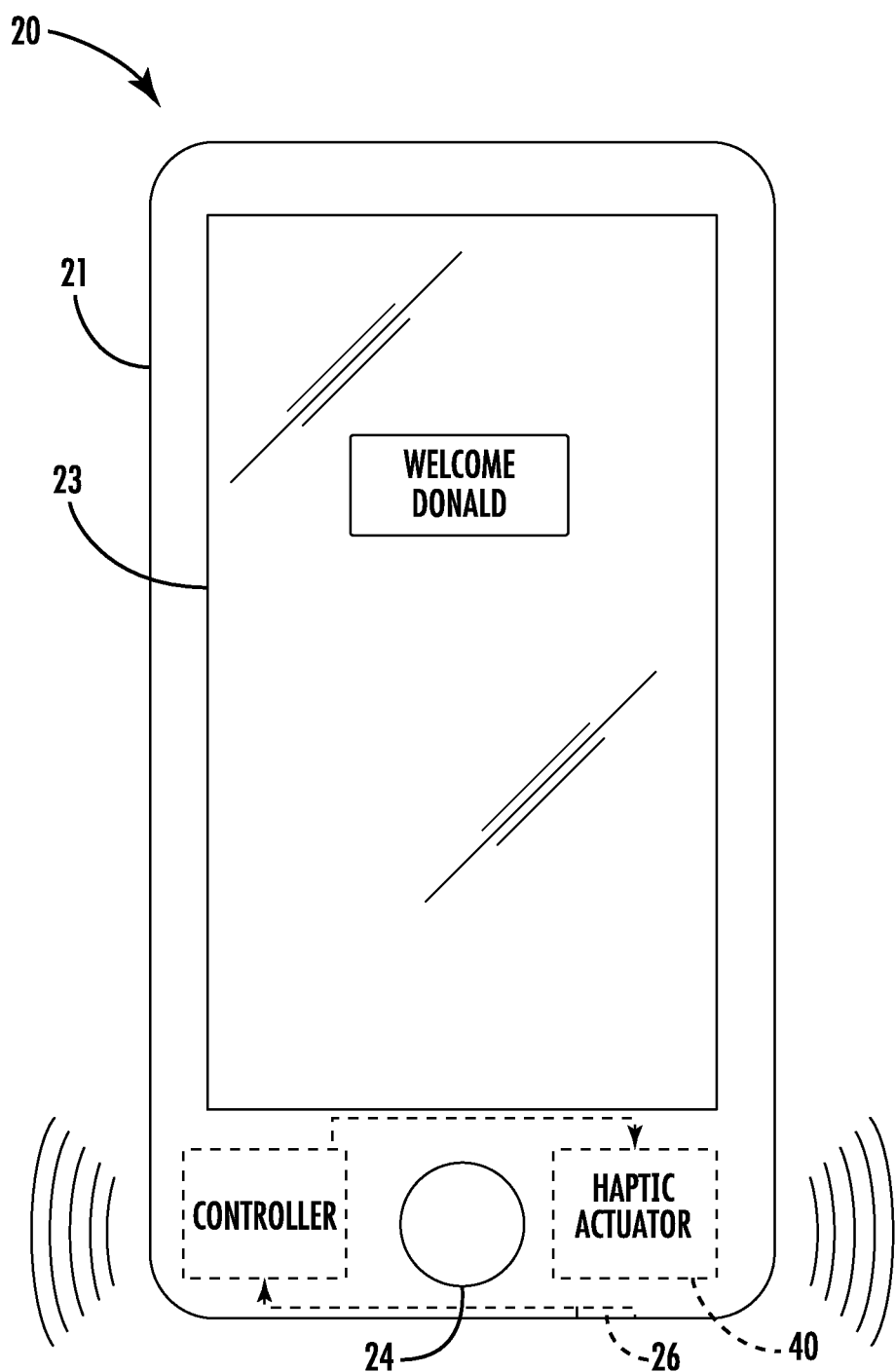
FIG. 1 is a perspective view of an electronic device including a haptic actuator according to an embodiment of the present invention.
Figure 2:
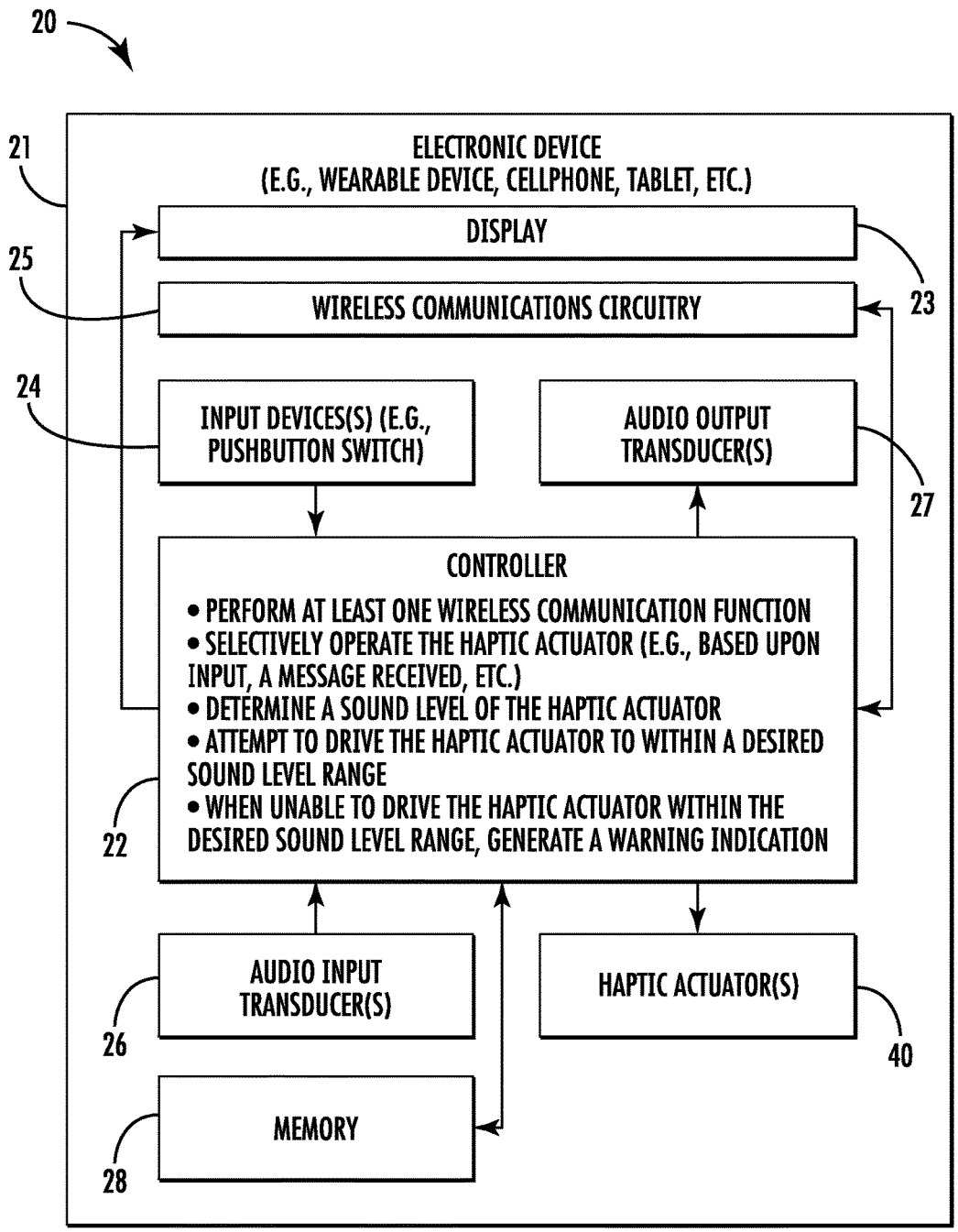
FIG. 2 is a schematic block diagram of the electronic device of FIG. 1.

Referring initially to FIGS. 1 and 2, an electronic device 20 illustratively includes a device housing 21 and a controller 22 carried by the device housing. The electronic device 20 is illustratively a mobile wireless communications device, for example, a mobile telephone. The electronic device 20 may be another type of electronic device, for example, a wearable wireless communications device, and includes a band or strap for securing it to a user, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a light emitting diode (LED) display, for example, or may be another type of display, for example, a liquid crystal display (LCD) as will be appreciated by those skilled in the art.

A finger-operated user input device 24 illustratively in the form of a pushbutton switch is also carried by the device housing 21 and is coupled to the controller 22. The pushbutton switch 24 cooperates with the controller 22 to perform a device function in response to operation thereof. For example, a device function may include a powering on or off of the electronic device 20, initiating communication via the wireless communications circuitry 25, and/or performing a menu function.

An audio input transducer 26 is also illustratively carried by the device housing 21. The audio input transducer 26, i.e. microphone, is coupled to the controller 22. An audio output transducer 27 or speaker may also be carried by the device housing 21 and be coupled to the controller 22.

Figure 3:
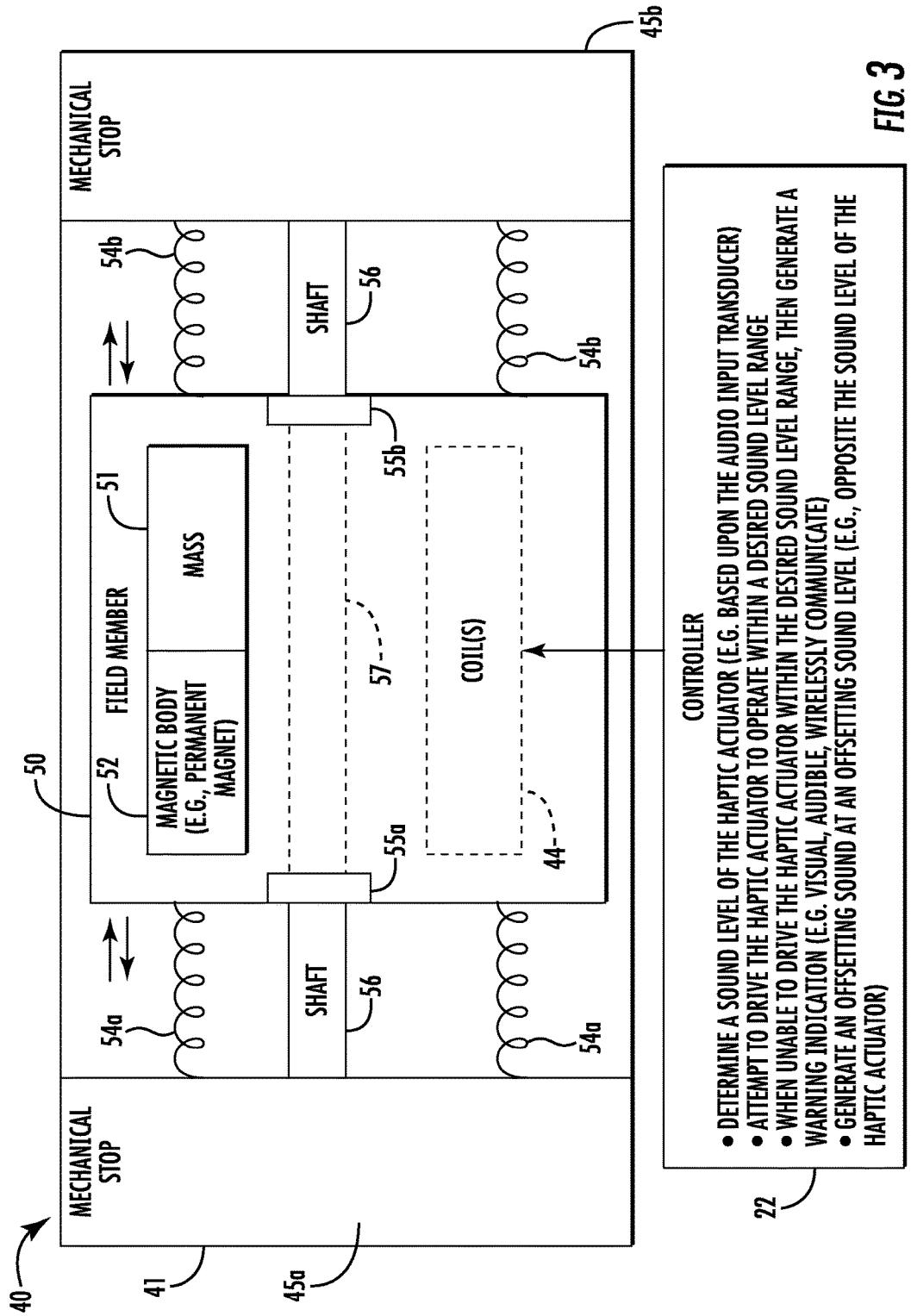
FIG. 3 is a more detailed schematic diagram of the haptic actuator of FIG. 1.

Referring now additionally to FIG. 3, the electronic device 20 illustratively includes a haptic actuator 40. The haptic actuator 40 is coupled to the controller 22 and determines user indications and operates the haptic actuator by way of applying power, current, or a voltage to a coil 44 to move a field member 50 based upon the user indication. More particularly, the haptic actuator 40 cooperates with the controller 22 to provide haptic feedback to the user. The haptic feedback may be in the form of relatively long and short vibrations or "taps", particularly, for example, when the electronic device 20 is in the form of a wearable device and the user is wearing the electronic device. The vibrations may be indicative of a message received, and the duration of the vibration may be indicative of the type of message received. Of course, the vibrations may be indicative of or convey other types of information.

While a controller 22 is described, it should be understood that the controller 22 may include one or more of a processor and other circuitry to perform the functions described herein, and some or all of the circuitry may be carried by an actuator housing and/or by the device housing 21.

Further details of the haptic actuator 40 are now described. The haptic actuator 40 includes an actuator housing 41. The coil 44 is carried by the actuator housing 41. Of course, there may be more than one coil carried by the housing 41.

The field member 50 is movable within the housing 41 responsive to the coil 44. The movement of the field member 50 creates the haptic feedback, or tapping, as will be appreciated by those skilled in the art. While the movement of the field member 50 may be described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 may include one or more masses 51 and may be shaped for a particular application or operation.

The field member 50 may also include one or more permanent magnets 52, i.e. magnetic bodies, cooperating with the coil 44 to provide movement of the field member 50. The field member 50 has a shaft receiving passageway 57 therein.

The haptic actuator 40 also includes biasing members 54a, 54b between the actuator housing 41 and the field member 50. The biasing members 54a, 54b are illustratively in the form of springs for maintaining the field member suspended in the housing 41. The springs 54a, 54b may be mechanical springs, such as, for example, coil springs, leaf springs, and flexures. The springs 54a, 54b may also or additionally be magnetic springs that, through interaction with the permanent magnets and/or ferritic parts of the actuator housing 41, if any, store and amplify the energy in the form of elastic/magnetic energy.

Additionally, the haptic actuator 40 includes a pair of bearings within the shaft receiving passageway 57. A shaft 56 extends through the bearings 55a, 55b and is coupled to the actuator housing 41 to permit reciprocal movement of the field member 50 along the shaft and within the housing responsive to the coil 44. Other and/or additional components, such as shafts, linear/angular bearings, sliding bearings, flexures, multi-bar linkage mechanisms, and springs, may enable motion of the field member 50 in the desired direction (e.g. X axis in a linear actuator or around a certain axis in an angular actuator) while constraining motion in other degrees of freedom.

The haptic actuator 40 also includes mechanical limit stops 45a, 45b between the housing 41 and the field member 50. The mechanical limit stops 45a, 45b limit the movement of the field member to a desired range and/or stop the field member from crashing or banging into the housing 41. While mechanical stops 45a, 45b are described, it will be appreciated that the mechanical stops may be part of or a portion of the housing 41.

Typically, circuitry, for example, the controller 22, generates a sinusoidal drive waveform that drives the field member to move from an initial at-rest position. Driving of the haptic actuator 40 generates sound, for example, acoustic noise. The amount of sound generated by driving the haptic actuator 40 or movement of the field member 50 may be dependent on the orientation of the electronic device 20, how the user is holding the electronic device, and/or whether the electronic device is in a pocket, bag, etc. As will be appreciated by those skilled in the art, too much sound generated by the haptic actuator 40 may be undesirable to the user.

More particularly, the controller 22 may use factory-calibrated waveforms to drive the haptic actuator 40. Over time, for example, as a result of normal wear and/or accidental events such as dropping, may cause electrical and/or mechanical properties of the haptic actuator 40 (e.g., Q-factor) to change such that the factory-calibrated waveform may be no longer "fit". Over or under-driving of the haptic actuator 40 may thus occur, which may lead to an increased number of failures. For example, when the Q-factor increases due to internal bearing wear/damage, vibration system damping reduces, and the pre-defined control or drive signal overdrives the haptic actuator 40 resulting in unwanted sounds or noises and/or collision of the field member 50 with the mechanical stops 45a, 45b.

Figure 4:
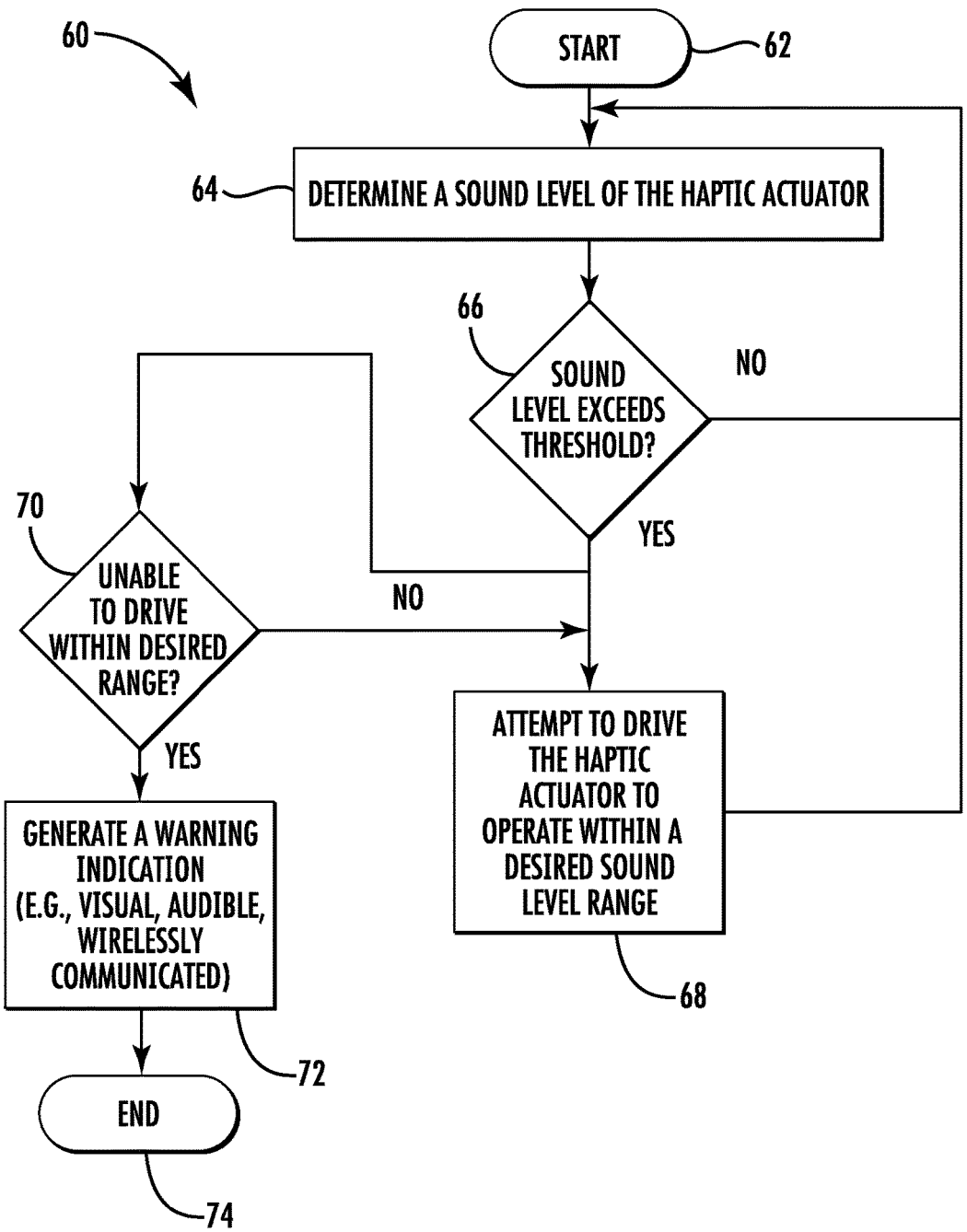
FIG. 4 is a flowchart illustrating operation of the electronic device of FIG. 2.

Referring now additionally to the flowchart 60 in FIG. 4, beginning at Block 62, to address increased sound levels that may occur over time, the controller 22 determines a sound level of the haptic actuator 40 (Block 64). The sound level may be determined based upon the audio input transducer 26. To more accurately measure the sound level, the audio input transducer 26 may be positioned within the device housing 21 adjacent the haptic actuator 40, and more particularly, directionally facing the haptic actuator. Thus, sound, primarily from within the device housing 21 is measured, and not necessarily ambient sounds from outside the device housing. The audio input transducer 26 may cooperate with the controller 22 to perform other functions, for example, user voice-based functions. In some embodiments, for increased space savings within the device housing 21, the haptic actuator 40 and the audio input transducer 26 may be coupled to the controller 22 via a flexible connector. Of course, the haptic actuator 40 and the audio input transducer 26 may be coupled to the controller 22 in a different configuration.

The controller 22, based upon the determined sound level, or quality, of the haptic actuator 40 (e.g., when the determined sound level exceeds a threshold or is outside a desired sound level range) (Block 66), attempts to drive the haptic actuator 40 to operate within a desired sound level range or sound quality range (Block 68). The desired sound level or sound quality range may be determined, for example, directly or indirectly, by a manufacturer of the electronic device 20, user of the electronic device, and/or software or applications installed and/or executed on the electronic device. The controller 22 may attempt to drive the haptic actuator 40 by changing the voltage, current, frequency, and/or characteristics of the generated drive waveform, for example. The process continues until the haptic actuator 40 operates within the desired sound level or quality or until the controller 22 determines that it is unable to drive the haptic actuator to within the desired sound level range.

When, at Block 70, the controller 22 is unable to drive the haptic actuator 40 within the desired sound level range, the controller generates a warning indication (Block 72) which may be indicative of haptic actuator failure. The controller 22 may be unable to drive the haptic actuator 40 to within the desired sound level range, for example, after a threshold time period and/or a threshold number of attempts to drive the haptic actuator to operate within the desired sound level range. Other and/or additional factors may be used by the controller 22 to make the determination of when the haptic actuator 40 is unable to be driven to operate within the desired sound level range. In some embodiments, the controller 22 may discontinue attempting to drive the haptic actuator to operate within the desired sound level range when the controller determines that it is unable to drive the haptic actuator within the desired sound level range.

The controller 22 may generate the warning indication as either or both of an audible indication via the audio output transducer 27 and a visual indication via the display 23. In some embodiments, the controller 22 may cooperate with the wireless communications circuitry 25 to wirelessly send the warning indication to a remote location, for example, to a repair facility. The controller 22 may also store in a memory 28 coupled to the controller historical sound level information including the haptic actuator 40 sound levels, the number of attempts to drive to haptic actuator. Other information may be stored in the memory 28, and/or the controller 22 may wirelessly send this historical information along with the warning notification.

In an attempt to further compensate for the haptic actuator 40 generating a sound level that may be outside the desired sound level range, the controller 22 may generate, via the audio output transducer 27, an offsetting sound level that may be opposite of or out of phase with the sound level of the haptic actuator. In other words, the offsetting sound generated by the audio output transducer 27 may have a cancelling effect with respect to the sound level generated by the haptic actuator 40. The method ends at Block 74.

Figure 5:
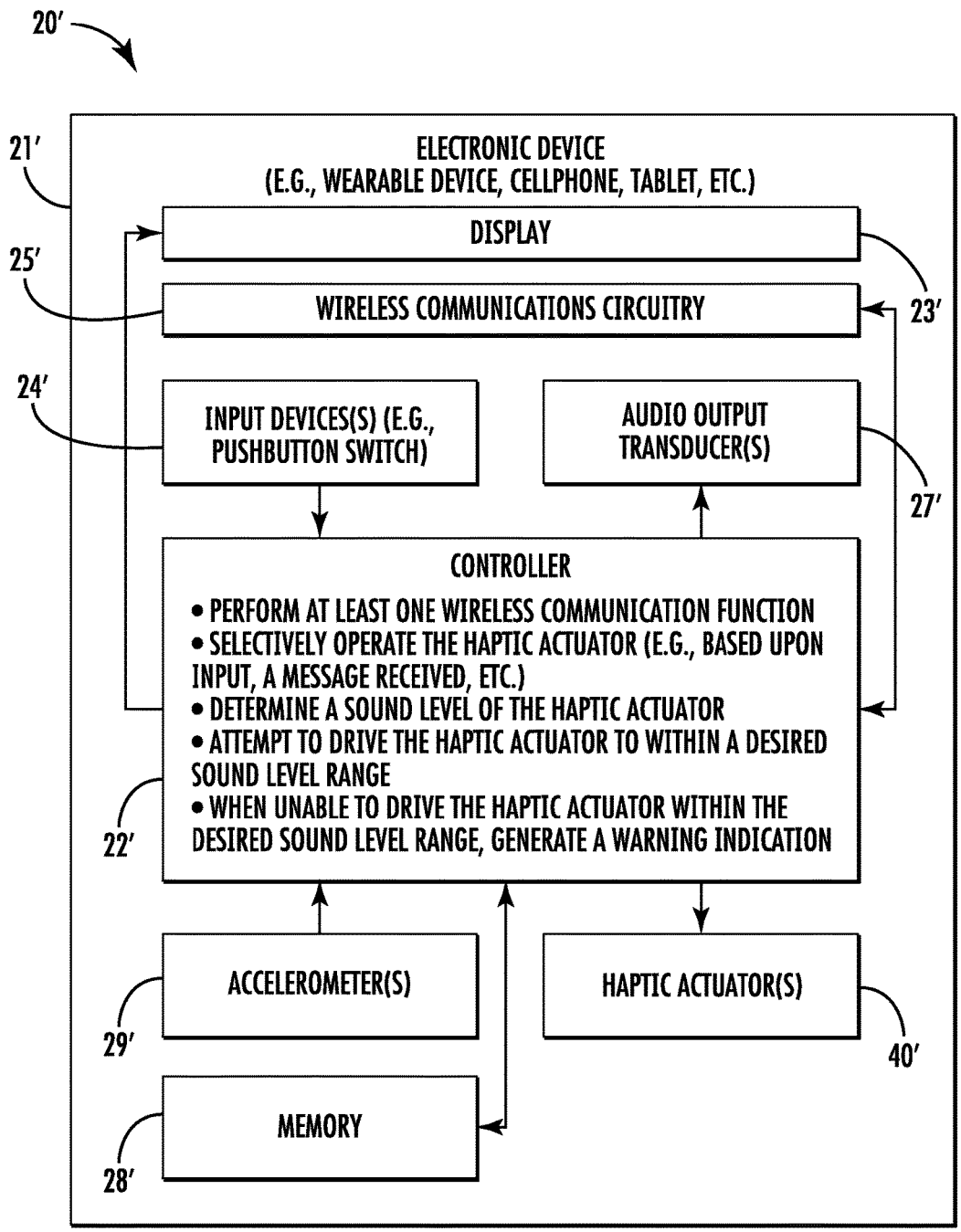
FIG. 5 is a schematic block diagram of an electronic device according to another embodiment.
Figure 6:
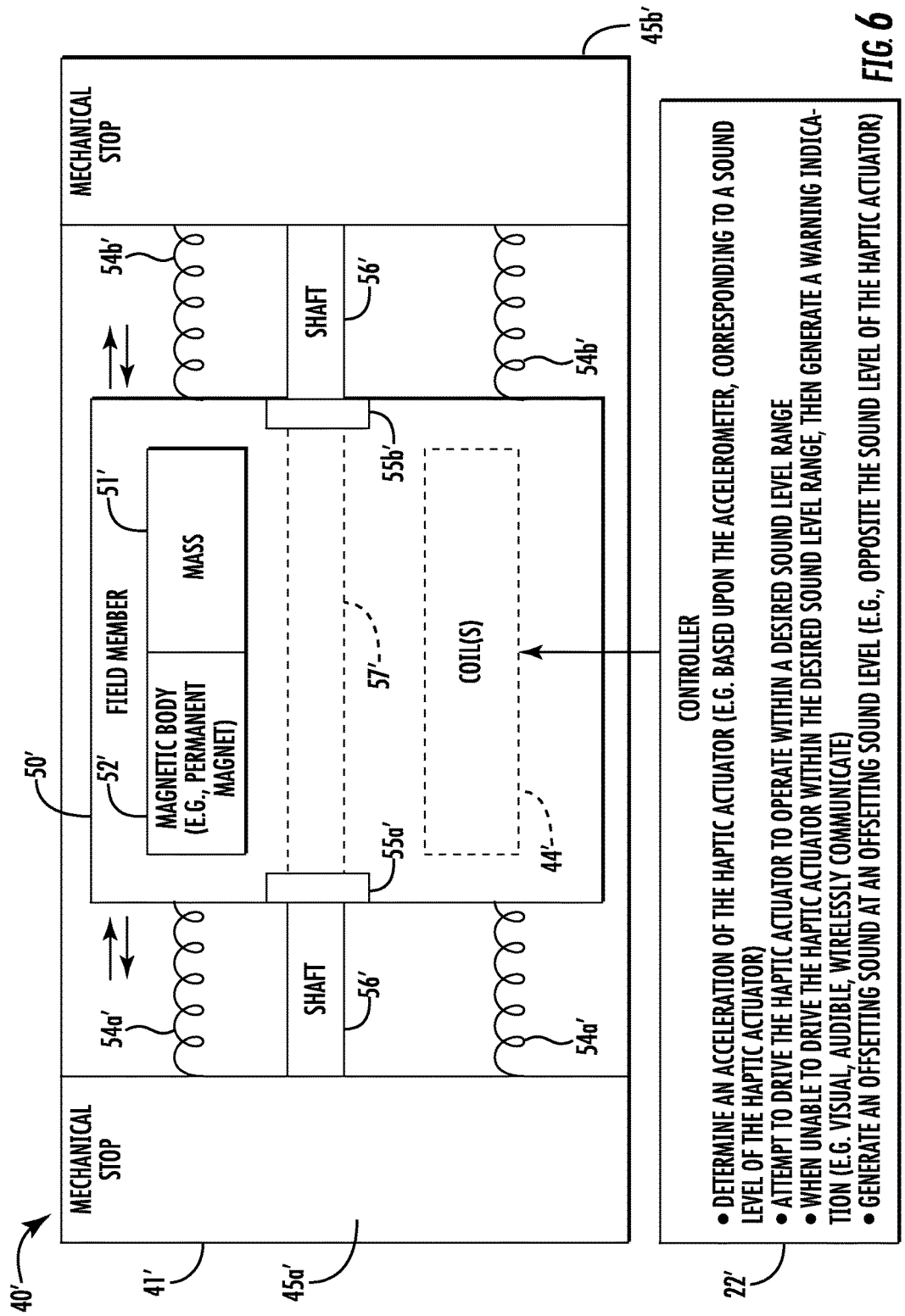
FIG. 6 is a more detailed schematic diagram of the haptic actuator of FIG. 5.
Figure 7:
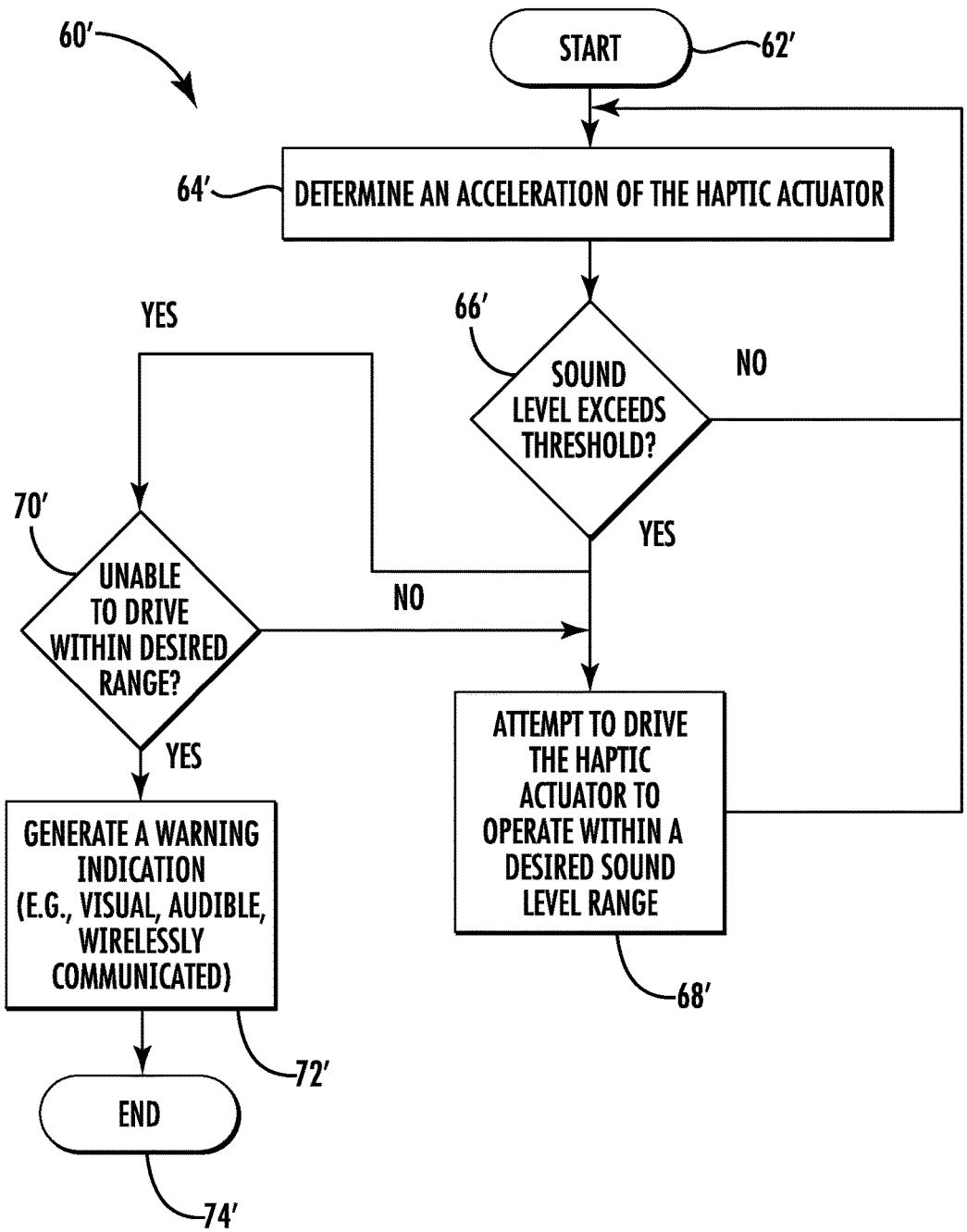
FIG. 7 is a flowchart illustrating operation of the electronic device of FIG. 5.

Referring now additionally to FIGS. 5 and 6, and the flowchart 60' in FIG. 7, beginning at Block 62', in another embodiment, the electronic device 20' includes an accelerometer 29' carried by the device housing 21' adjacent the haptic actuator 40'. The accelerometer 29' is coupled the controller 22'. Similar to the audio input transducer embodiment described above, to address increased sound levels that may occur over time, the controller 22' determines an acceleration of the haptic actuator 40' (Block 64'). The acceleration is determined based upon the accelerometer 29', and a given acceleration may correspond to a given sound level of the haptic actuator 40'. The given acceleration may also correspond to a given force and/or momentum of the haptic actuator 40'. To more accurately measure the acceleration, the accelerometer 29' may be positioned within the device housing 21' adjacent the haptic actuator 40' or in contact with the haptic actuator.

The controller 22', based upon the determined acceleration of the haptic actuator 40' (e.g., when the determined acceleration exceeds a threshold corresponding to a desired sound level range or momentum) (Block 66'), attempts to drive the haptic actuator 40' to operate within a desired sound level range or momentum (Block 68'). The desired sound level range may be determined, for example, directly or indirectly, upon a manufacturer of the electronic device, user of the electronic device, and/or software or applications installed and/or executed on the electronic device. The controller 22' may attempt to drive the haptic actuator 40' by changing the voltage, current, frequency, and/or characteristics of the generated drive waveform, for example. The process continues until the haptic actuator 40' operates within the desired sound level or until the controller 22' determines that it is unable to drive the haptic actuator within the desired sound level range.

When, at Block 70', the controller 22' is unable to drive the haptic actuator 40' within the desired sound level range, the controller generates a warning indication (Block 72') which may be indicative of haptic actuator failure. The controller 22' may be unable to drive the haptic actuator 40' within the desired sound level range, for example, after a threshold time period and/or a threshold number of attempts to drive the haptic actuator to operate within the desired sound level range. Other and/or additional factors may be used by the controller 22' to make the determination of when the haptic actuator 40' is unable to be driven to operate within the desired sound level range. In some embodiments, the controller 22' may discontinue attempting to drive the haptic actuator to operate within the desired sound level range when the controller determines that it is unable to drive the haptic actuator within the desired sound level range.

The controller 22' may generate the warning indication as either or both of an audible indication via the audio output transducer 27' and a visual indication via the display 23'. In some embodiments, the controller 22' may cooperate with the wireless communications circuitry 25' to wirelessly send the warning indication to a remote location, for example, to a repair facility. The controller 22' may also store in a memory 28' coupled to the controller historical sound level information including the haptic actuator sound levels, the number of attempts to drive to haptic actuator 40'. Other information may be stored in the memory 28', and/or the controller 22' may wirelessly send this historical information along with the warning notification.

In an attempt to further compensate for the haptic actuator 40' generating a sound level that may be outside the desired sound level range, the controller 22' may generate, via the audio output transducer 27', an offsetting sound level that may be opposite of or out of phase with the sound level of the haptic actuator. In other words, the offsetting sound generated by the audio output transducer 27' may have a cancelling effect with respect to the sound level generated by the haptic actuator 40'. The method ends at Block 74'.

It should be understood that while two embodiments have been described herein, particularly with respect to determining a sound level of the haptic actuator 40 and an acceleration of the haptic actuator, both a sound level and an acceleration may be determined by the controller 22 via an audio input transducer 26 and an accelerometer 29', respectively. Thus, the controller 22 may attempt to drive the haptic actuator 40 to operate within the desired sound range based upon the determined sound level and determined acceleration. The accelerometer 29' may also be used for determining an orientation of the device housing. The determined orientation may also be used as a basis for attempting to drive the haptic actuator 40 to be within the desired sound level range. Moreover, additional devices or sensors, for example, a Hall effect sensor and/or proximity sensor, may be coupled to the controller 22 and used to determine positional changes which may correspond to sound levels of the haptic actuator 40.

Moreover, the controller 22 may cooperate with more than one audio input transducer 26 to determine the sound level. The electronic device 20 may include more than one haptic actuator 40 for which the controller 22 determines a sound level and for which the controller attempts to drive to operate within a desired sound level range.

In other embodiments, the haptic actuator 40 may include a permanent magnet 52 carried by the actuator housing 41, and the field member 50 may include one or more coils 44 that cooperate with the permanent magnet. In other words, in contrast to the embodiments described above, the permanent magnet may be stationary (i.e., carried by the actuator housing 41) and the coils 44, as part of the field member 50 are moving (i.e., connected to the mass). Of course, there may be any number of coils and/or permanent magnets.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a device housing;
   a haptic actuator carried by the device housing;
   an audio input transducer carried by the device housing;
   an audio output transducer carried by the device housing; and
   a controller carried by the device housing and configured to
      drive the haptic actuator,
      determine a sound level of the haptic actuator using the audio input transducer, and
      drive the audio output transducer based upon the determined sound level with an offsetting sound level so that the haptic actuator operates within a desired sound level range.

2. The electronic device of claim 1 wherein the controller is configured to drive the haptic actuator based upon the determined sound level.

3. The electronic device of claim 1 wherein the controller is configured to generate a warning indication based upon the determined sound level.

4. The electronic device of claim 3 further comprising wireless communications circuitry carried by the device housing; and wherein the controller is configured to communicate the warning indication via the wireless communications circuitry.

5. The electronic device of claim 1 wherein the audio input transducer is positioned within the device housing facing the haptic actuator.

6. The electronic device of claim 1 wherein the haptic actuator comprises:
   a haptic housing;
   a field member movable within the haptic housing;
   at least one magnet; and
   at least one coil cooperating with the at least one magnet to move the field member within the haptic housing.

7. A method of operating an electronic device comprising a haptic actuator, an audio input transducer, and an audio output transducer, the method comprising:
   driving the haptic actuator;
   determining a sound level of the haptic actuator using the audio input transducer; and
   driving the audio output transducer based upon the determined sound level to generate an offsetting sound for the haptic actuator so that the haptic actuator operates within a desired sound level range.

8. The method of claim 7 comprising driving the haptic actuator based upon the determined sound level.

9. The method of claim 7 comprising generating a warning indication based upon the determined sound level.

10. The method of claim 7 wherein the audio input transducer is positioned within a device housing facing the haptic actuator.

11. The method of claim 7 wherein the haptic actuator comprises:
    a haptic housing;
    a field member movable within the haptic housing;
    at least one magnet; and
    at least one coil cooperating with the at least one magnet to move the field member within the haptic housing.

12. An electronic device comprising:
    a device housing;
    a haptic actuator carried by the device housing;
    an accelerometer carried by the device housing;
    an audio output transducer carried by the device housing; and
    a controller carried by the device housing and configured to
       drive the haptic actuator,
       determine an acceleration of the haptic actuator using the accelerometer, and
       drive the audio output transducer based upon the determined acceleration to generate an offsetting sound for the haptic actuator so that the haptic actuator operates within a desired sound level range.

13. The electronic device of claim 12 wherein the controller is configured to drive the haptic actuator based upon the determined sound level.

14. The electronic device of claim 12 wherein the controller is configured to generate a warning indication based upon the determined sound level.

15. The electronic device of claim 14 further comprising wireless communications circuitry carried by the device housing; and wherein the controller is configured to communicate the warning indication via the wireless communications circuitry.

16. The electronic device of claim 12 wherein the accelerometer is adjacent the haptic actuator.

17. The electronic device of claim 12 wherein the haptic actuator comprises:
- a haptic housing;
- a field member movable within the haptic housing;
- at least one magnet; and
- at least one coil cooperating with the at least one magnet to move the field member within the haptic housing.

18. A method of operating an electronic device comprising a haptic actuator, an accelerometer, and an audio output transducer, the method comprising:
- driving the haptic actuator;
- determining a sound level of the haptic actuator using the accelerometer; and
- driving the audio output transducer based upon the determined sound level to generate an offsetting sound for the haptic actuator so that the haptic actuator operates within a desired sound level range.

19. The method of claim 18 comprising driving the haptic actuator based upon the determined sound level.

20. The method of claim 18 comprising generating a warning indication based upon the determined sound level.

21. The method of claim 18 wherein the accelerometer is positioned adjacent the haptic actuator.

22. The method of claim 18 wherein the haptic actuator comprises:
- a haptic housing;
- a field member movable within the haptic housing;
- at least one magnet; and
- at least one coil cooperating with the at least one magnet to move the field member within the haptic housing.

* * * * *